2,776,987
METAL SALTS OF SULFO-N-CARBAMYLSUC-
CINAMIC ACID ESTERS

Pliny O. Tawney, Passaic, N. J., assignor to United States Rubber Company, New York, N. Y., a corporation of New Jersey No Drawing. Application March 10, 1954,
Serial No. 415,450

7 Claims. (Cl. 260—481)

This invention relates to a new class of chemicals which are useful as detergents, emulsifiers and wetting agents.

These new compounds are the alkali metal and alkaline-earth metal sulfonates of N-carbamylsuccinamic esters of non-tertiary alcohols, wherein (1) each nitrogen atom is attached to at least one hydrogen atom, (2) any remaining nitrogen bond is attached to a hydrocarbon group, and (3) the metal has an atomic number which is less than 56.

They are made by addition of a bisulfite of an alkali metal or an alkaline-earth metal of atomic number less than 56 to an N-carbamylamic ester having the alpha, beta butenedioic skeleton. Ammonium is to be considered a hypothetical "alkali metal."

The new class of compounds has the structure:

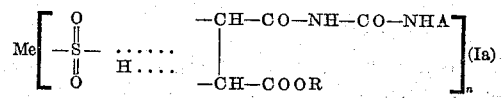

wherein Me is an alkali metal, including ammonium, or alkaline-earth metal of atomic number less than 56; $n$ is an integer which is not more than two; the symbol : : : : : : indicates that the sulfo group is connected to either one of the two alpha carbon atoms and the hydrogen to the other one; R is the residue of a non-tertiary alcohol; and A is hydrogen or a hydrocarbon group.

The symbol R stands for the residue of any non-tertiary alcohol, regardless of the number of alcohol groups it contains, and regardless of the presence or absence of other substituents such as chloride, nitro, or other groups. It is also to be understood that the sulfo-N-carbamylsuccinamic esters of polyhydric alcohols, wherein any or all of the non-tertiary alcoholic hydroxyl groups are thus esterified, are included in this invention. Thus, the preferred sub-class of new esters made from polyhydric alcohols can be represented by the following structure:

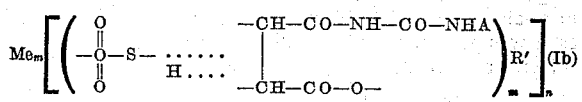

wherein $m$ is an integer, and R' is the residue of a polyhydric alcohol, R'(OH)$_m$ having at least two non-tertiary alcoholic hydroxyl groups, which alcohol can contain one or more additional alcoholic hydroxyl groups not involved in the formation of compound Ib.

Hereinafter, for brevity, the compounds involving the symbols R' and $m$ will not be shown. However, it is to be understood that wherever the symbols R appears subsequently, as in structural Formulas II–V and in reactions 3, 4a and 4b, it is intended that the formulas and the reaction shall cover not only the reactions involving monohydric alcohols ROH but also the corresponding reactions involving the polyhydric alcohols R'(OH)$_m$.

Also, for brevity, the said class of N-carbamylamic esters which are used as reagents in my invention will be referred to herein as "N-carbamylamic" esters, and the new products of this invention will be referred to as "sulfo-N-carbamylsuccinamic" esters.

Each of the new compounds may be derived, by using the following reactions, from a urea having not more than one hydrocarbon substituent, and maleic anhydride:

1.

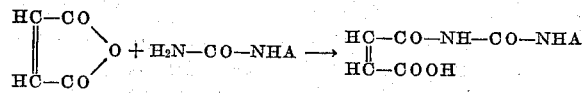

These N-carbamylmaleamic acids, and methods of making them, are well-known.

Typical N-carbamylmaleamic acids, made by the known reaction #1, are:

N-carbamylmaleamic acid itself (also called maleuric acid), M. P. 161–162° C. with decomposition;

N-(n-butylcarbamyl)-maleamic acid, M. P. 105.5–107° C.;

N-(tert-butylcarbamyl)-maleamic acid, M. P. 151.5–153.5° C.; and

N-(phenylcarbamyl)-maleamic acid, M. P. 162–163° C.

The urea can be urea itself (NH$_2$—CO—NH$_2$) or a urea which has a hydrocarbon radical instead of one of the hydrogen atoms. This radical can be any radical containing only carbon and hydrogen, such as an alkyl, alkenyl, cycloalkyl, terpenyl, aralkyl or aryl group. Typical alkyl ureas are N-methylurea, N-ethylurea, N-propylurea, N-isopropylurea, N-n-butylurea, N-sec-butylurea, N-isobutylurea, N-tert-butylurea, the N-amylureas, N-n-hexylurea, N-n-heptylurea, N-n-octylurea, N-n-nonyl urea, N-n-dodecylurea and N-n-octadecylurea. Typical alkenyl ureas are N-allylurea, N-methallylurea and N-crotylurea. A typical cyclo alkyl urea is N-cyclohexylurea. A typical terpenyl urea is N-bornylurea. Typical aralkyl ureas are N-benzylurea and N-phenethylurea. Typical aryl ureas are N-phenylurea, the three N-tolylureas and the two N-naphthylureas.

The N-carbamylmaleamic acids are then converted to N-carbamylmaleimides, as follows:

2.

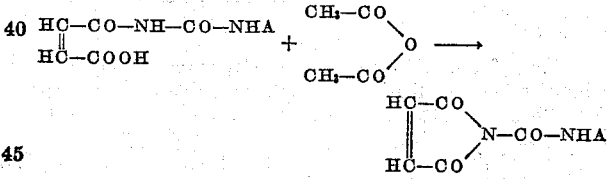

These new N-carbamylmaleimides are disclosed by Robert H. Snyder in an application Serial No. 367,108, filed July 9, 1953, which is a continuation-in-part of his application Serial No. 312,870, filed October 2, 1952, now abandoned.

Typical of these reactions is the following; all parts being by weight:

A mixture of 50 parts of N-carbamylmaleamic acid (maleuric acid) and 120 parts of glacial acetic acid is heated to about 80° C. Acetic anhydride (50 parts) is added gradually to the stirred mixture, which is held at the same temperature until practically all of the suspended maleuric acid has disappeared. The hot solution is filtered, and cooled to room temperature, causing crystallization of a white product. This material, the new compound N-carbamylmaleimide itself, melts at 157–158° C.

Similarly, each of other typical N-carbamylmaleamic acids is converted to the corresponding N-carbamylmaleimide:

N-(n-butylcarbamyl)-maleimide, M. P. 66.5–68° C.;
N-(tert-butylcarbamyl)-maleimide, M. P. 106.0–107.5° C.;
N-(phenylcarbamyl)-maleimide, M. P. 140–141° C.; (this compound was recrystallized from benzene);
N-(phenylcarbamyl)-maleimide is pale yellow. All of the others are white.

The N-carbamylmaleimides are next converted to the corresponding N-carbamylamic esters. To clarify the description of the invention, I divide the N-carbamylamic esters which are usable for reacting with the bisulfite, into two structural classes, namely: (II) the N-carbamylmaleamic esters and (III) the N-carbamylfumaramic esters. These classes of compounds are shown structurally as follows:

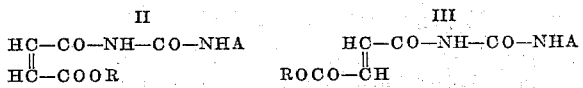

The N-carbamylmaleamic esters are disclosed by R. H. Snyder and P. O. Tawney in an application Serial No. 395,281, filed November 30, 1953. The N-carbamylfumaramic esters are disclosed by R. J. Kelly and C. E. Bryan in an application Serial No. 395,284, filed November 30, 1953.

The N-carbamylmaleamic esters are made from an alcohol and an N-carbamylmaleimide as follows:

3a.

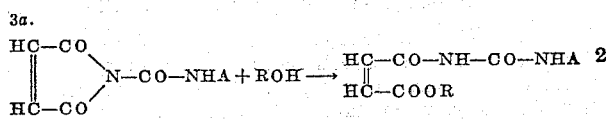

The N-carbamylfumaramic esters are made either directly, as shown in Equation 3b, from an alcohol and N-carbamylmaleimide in the presence of aluminum chloride, or from the intermediate N-carbamylmaleamic esters, as shown in Equation 3c:

3b.

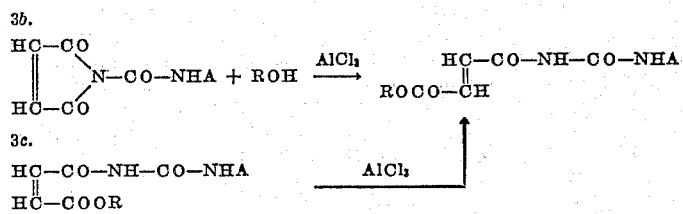

I have found that the N-carbamylamic esters react with bisulfites of alkali metals or alkaline-earth metals to form the new sulfo-N-carbamylsuccinamic esters of this invention.

Each of the reagents having the structures II or III reacts as follows:

4a.

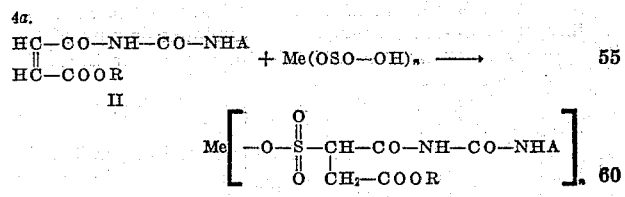

4b.

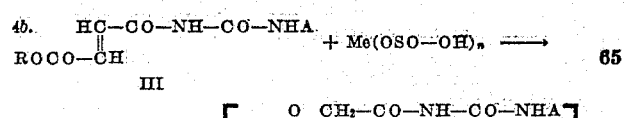

I have assigned the structure IV to the adduct formed from the cis reagent II, and structure V to the adduct from the trans reagent III. However, II could equally well form V, and III likewise could form IV. I have found experimentally that the bisulfite adducts of II and of III are not identical; hence, one of them should be IV, and the other V.

Therefore, it is evident that each of the new compounds of this invention may be represented by either of two structures. All of these compounds and mixtures of pairs of isomers, are considered to be part of the invention. For convenience, I call all of them salts of sulfo-N-carbamylsuccinamic esters, discounting the position of the sulfo group.

Typical N-carbamylmaleamic esters are made as follows:

PROCESS A

This process illustrates the preparation of N-carbamylmaleamic esters in an excess of the reacting alcohol, the excess being used as the solvent.

A mixture of 203 parts of N-carbamylmaleimide and 320 parts of methanol is boiled under a reflux condenser for an hour. The solution is treated with decolorizing carbon and filtered while hot. It is then cooled to room temperature, causing the white product, methyl maleurate, to crystallize. After recrystallization from methanol it melts at 113–114° C. The yield is 200 parts, or 80% of theory.

PROCESS B

This process illustrates the preparation of N-carbamylmaleamic esters in an inert solvent. This process is especially useful when it is undesirable to use an excess of the alcohol as the solvent because of difficulty in separating it from the product.

The following maleuric esters were made by boiling under reflux a mixture of N-carbamylmaleimide, a very slight molar excess of the appropriate alcohol, and about six volumes of p-dioxan per volume of the sum of the reagents, for 16 hours. Most of the dioxan was removed in vacuo, causing the desired ester to crystallize. The ester was purified by recrystallization from an appropriate solvent, as shown:

| Alcohol | Solvent of Recrystn. | Ester Yield (percent) | Melting Point (° C.) |
|---|---|---|---|
| n-Butanol | CCl₄ | 47 | 95–99 |
| n-Dodecanol | Ethanol | 40 | 110–111 |

PROCESS C

This process illustrates the use of a catalyst such as zinc chloride in the preparation of N-carbamylamic esters, as disclosed in my copending application Serial No. 395,283, filed November 30, 1953.

The following N-carbamylmaleamic esters were made by heating a mixture of N-carbamylmaleimide (except as noted) and the appropriate alcohol, in the proportions shown, in the presence of zinc chloride (about 2–4 parts per 100 parts of the mixture of reagents) for a few hours at 85–100° C.

| | Alcohol:N-Carbamylmaleimide (mols) | | Product, Melting Point (° C.) |
|---|---|---|---|
| | Alcohol | Feed Ratio | Product Ratio | |
| 1 | Castor Oil | 1:1.5 | 1:1.2 | Viscous liquid. |
| 2 | do | 1:2.8 | 1:2 | Do. |
| 3 | Alkyd resin [a] | 1:2.1 | 1:2 | Viscous, clear liquid. |
| 4 | Benzyl alcohol | [b]1:1 | 1:1 | 65.5–66.5°.[c] |
| 5 | n-Dodecanol | [d]1:1 | 1:1 | Viscous, clear liquid. |
| 6 | 2-(p-Octylphenoxy)ethanol-1 | [d]1:1 | 1:1 | Do. |

[a] Made conventionally by heating 5.7 mols of adipic acid, 5.6 mols of ethylene glycol, and 2.4 mols of propylene glycol under an inert gas until the acid number was almost zero, followed by removal of excess glycol in vacuo. The average molecular weight of the alkyd resin was 1870.
[b] N-(n-butylcarbamyl)-maleimide.
[c] After recrystallization from a mixture of water and methanol. Yield 78%.
[d] N-(tert-butylcarbamyl)-maleimide.

The N-carbamylmaleamic esters used in the invention can also be made by a combination of the several techniques. This is illustrated as follows:

The following N-carbamylmaleamic esters were made by heating a mixture of N-carbamylmaleimide (except as noted) and the appropriate alcohol, in the presence of zinc chloride (about 2–4 parts per 100 parts of the mixture of reagents) and a solvent for a few hours at 80–100° C. When the solvent is an excess of the reacting alcohol the amount of zinc chloride is based on that amount of the alcohol which is equivalent to the N-carbamylmaleimide. When an inert liquid is present only the equivalent amount of alcohol is used. The volume of solvent was about 2–5 times the sum of the volumes of the reagents.

| | Alcohol | Solvent | N-Carbamylmaleamic Ester | |
|---|---|---|---|---|
| | | | Yield (Percent) | Melting Point (° C.) |
| 7 | n-Octanol | Benzene | 87 | 103–107. |
| 8 | Tridecanol | Dioxan | 89 | Uncrystallizable oil. |
| 9 | n-Octadecanol | do | 89 | 73.0–75.5. |
| 10 | 2-Nitrobutanol-1 | do | 50 | 104–107. |
| 11 | 2-(p-Octylphenoxy)ethanol-1 | do | 91 | Uncrystallizable oil. |
| 12 | 1,5-Pentanediol | do | [a]31 | 124–133. |
| 13 | Hydrogenated castor oil.[b] | Toluene | 79 | Viscous liquid. |
| 14 | 2-Propanol [c] | 2-Propanol | 88 | 96–97. |

[a] Pentamethylene bis-(N-carbamylmaleamate).
[b] Three mols of N-carbamylmaleimide per mol of hydrogenated castor oil, both in feed and in product.
[c] Reacted with N-(tert-butylcarbamyl)-maleimide.

Typical alcohols which are operable in making the esters used as reagents in the invention are the monohydric aliphatic alcohols, e. g., methanol, ethanol, 1-propanol, 2-propanol, 1-butanol, 2-ethylhexan-1-ol, 1-dodecanol, 1-octadecanol; the unsaturated alcohols, e. g., allyl alcohol and methallyl alcohol; the halogenated alcohols, e. g., ethylene chlorohydrin; the nitroalcohols, e. g., 2-nitrobutanol; the ether-alcohols, e. g., ethylene glycol monoethyl ether and diethylene glycol monoethyl ether; the cycloalkyl alcohols, e. g., cyclohexanol; the aralkyl alcohols, e. g., benzyl alcohol; the tertiary-amino alcohols, e. g., triethanolamine; the cyanoalcohols, e. g., beta-cyanoethanol; the alcohols formed by reduction of the carbon monoxide-olefin products made by the "oxo" process; the hydroxy acids and esters, e. g., glycolic acid; the polyhydric alcohols, e. g., ethylene glycol, the polyethylene glycols, polymeric alcohols which have been formed by oxidizing and then partially reducing isoolefin:conjugated diolefin copolymers, alkyd resins having terminal alcoholic hydroxyls, glycerol, pentaerythritol, cellulose, starch, glucose, sucrose, sorbitol, polyvinyl alcohol, and partial ethers and esters thereof; monoglycerides; diglycerides; triglycerides containing one or more alcoholic hydroxyl groups, e. g., castor oil and "blown" oils made from oils such as soya and linseed oils; methylol phenols, e. g., 2,6-dimethylol 4-alkyl-phenols and their condensation polymers; N-methylol compounds, e. g., N-methylolmaleimide and N,N'-dimethylolurea; and alcohols containing sulfone groups, e. g., those alcohols made from a glycol and divinyl sulfone. Tertiary alcohols are not operable in the invention.

The N-carbamylfumaramic esters are made as shown by Kelly and Bryan, loc. cit., either from the corresponding cis esters or directly from an appropriate alcohol and an appropriate N-carbamylmaleimide. In either case the reaction is carried out in the presence of aluminum chloride and a solvent. This solvent usually is an excess of the alcohol used either directly or indirectly in the reaction. The formation of each of the N-carbamylfumaramic esters, either from the alcohol and the imide or from the intermediate cis esters, usually takes place rapidly with little or no external heating, and the yield is often almost quantitative. In fact, heat is evolved during the formation of the trans esters of the lower alkanols. If no heat is evolved it is advisable to heat the reaction mixture for one or two hours at a moderate temperature, e. g., 100° C., to be sure that the reaction has been completed. Some typical N-carbamylfumaramic esters are:

Methyl N-carbamylfumaramate, M. P. 228–230° C.;
2-nitrobutyl N-carbamylfumaramate, M. P. 214–215° C.;
n-Dodecyl N-carbamylfumaramate, M. P. 152–157° C.;
n-Butyl N-carbamylfumaramate, M. P. 166–168° C.

Any of the N-carbamylmaleamic esters can be thus isomerized easily into the corresponding N-carbamylfumaramic esters. Both the cis and the trans esters are useful as reagents in making the new sulfo-N-carbamylsuccinamic esters of this invention.

The sulfo-N-carbamylsuccinamic esters are made, as shown in reactions 4a and 4b, directly by addition of a bisulfite to the olefinic group of the N-carbamylamic esters. This bisulfite is the salt of an alkali metal or an alkaline-earth metal whose atomic number is less than 56. Such metals are lithium, sodium, potassium, cesium, magnesium, calcium, and strontium. I prefer to use sodium bisulfite. Ammonium bisulfite also is operable in my invention. Therefore, throughout this application I use the term "alkali metal" as including lithium, sodium, potassium, cesium, and the ammonium radical.

The reaction between an N-carbamylamic ester and a bisulfite salt is customarily carried out in water. Normally, a sufficient amount of water is used to dissolve all of the bisulfite, but this is not essential. When the reacting ester is quite soluble in water the reaction often takes place rapidly without addition of external heat, and in fact with the evolution of a considerable amount of heat. Such an ester is methyl maleurate. When the reacting ester is only slightly soluble, or even substantially insoluble, in water the reaction mixture should be heated gently, e. g., up to 100° C., and stirred vigorously. To increase the solubility of the reacting ester in the bisulfite solution I sometimes also add a small proportion of methanol or ethanol. The reaction is usually complete within a few minutes, or at most, a few hours.

The following examples illustrate the invention; all parts are by weight. For brevity I show the reaction with sodium bisulfite and various N-carbamylamic esters, but it is understood that the reaction takes place between any of the named bisulfite salts and any of the N-carbamylamic esters.

*Example 1*

To a stirred solution of 424 parts of sodium bisulfite in 585 parts of water there was added 469 parts of methyl maleurate during an hour. The temperature of the solution, originally at room temperature, rose spontaneously to 55° C. When the exothermic reaction appeared to be over, more water (750 parts) was added to dissolve the precipitated product, and the solution was heated for 1.5 hours at 70–75° C. It was then filtered while hot, diluted with an equal volume of ethanol, and left at room temperature for several hours to promote crystallization. The methyl sodium sulfo-N-carbamylsuccinamate was filtered and washed with 50% aqueous ethanol and then with 95% ethanol, and dried. A second crop of this product was obtained from the mother liquor on chilling it to 7° C. A total of 629 parts, or 84% of theory, of the new white crystalline product was obtained. It melts at 188° C. and decomposes rapidly with gas evolution at about 203° C. It lowers the surface tension of water.

Analysis.—Calculated for $C_6H_9O_7N_2SNa$: nitrogen 10.2%, sulfur 11.6%. Found: nitrogen 9.8%, sulfur 11.3%.

Example 2

A stirred mixture of 5 parts of methyl N-carbamylfumaramate, 6.4 parts of sodium bisulfite and 20 parts of water was heated for 2.5 hours at 85–95° C. The clear solution was then diluted with four volumes of 95% ethanol and cooled to room temperature. The white crystalline product was filtered, washed with ethanol, and dried. It melted to a slight extent at 211° C., and darkened somewhat at about 223° C., but was not otherwise affected by heating to 285° C. The yield of this new compound was 4.2 parts, or 53% of theory for methyl sodium sulfo-N-carbamylsuccinamate. It lowers the surface tension of water.

It is evident that the new compounds described in Examples 1 and 2 are isomeric rather than identical with each other, although because of incomplete knowledge of their structures they have been given the same name. Presumably, they are the compounds represented by the two isomeric structures:

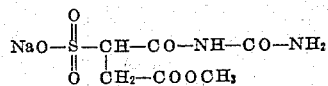

and

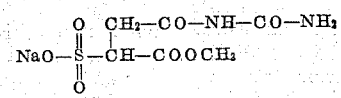

Example 3

To a solution of 73 parts of sodium bisulfite in 185 parts of water there was added 50 parts of n-butyl maleurate. As there appeared to be no exothermic reaction the suspension was heated at 80–85° C. Within five minutes the solid maleurate ester dissolved. Heating was continued for 15 minutes more, and then the solution was filtered while hot, and left for several hours at room temperature. The crude solid mixture of the new product and sodium bisulfite was filtered, and then was recrystallized by dissolving it in 100 parts of hot water, adding 80 parts of ethanol, and allowing the solution to cool slowly to room temperature. The fine, white n-butyl sodium N-carbamylsuccinamate was filtered, washed, and dried in vacuo. Yield 44.4 parts, or 60% of theory. Melting point 190–200° C. with decomposition. It lowers the surface tension of water.

Analysis:

|  | Calcd. for $C_9H_{15}O_7N_2SNa$ | Found |
|---|---|---|
|  | Percent | Percent |
| Carbon | 34.0 | 33.8, 33.8 |
| Hydrogen | 4.8 | 5.0, 4.9 |
| Nitrogen | 8.8 | 8.7, 8.7 |
| Sulfur | 10.1 | 10.2 |

Example 4 n-Dodecyl maleurate (700 parts) was added to a warm solution of 280 parts of sodium bisulfite in 1050 parts of water, and the mixture was heated. At 60° C. more water (3500 parts) was added in order to improve fluidity, and the mixture was then heated for two hours at 90–95° C. The clear, foaming solution was diluted with 6000 parts of 95% ethanol, and held at 7° C. overnight to promote crystallization. The white n-dodecyl sodium sulfo-N-carbamylsuccinamate was filtered, washed with ethanol, and dried. The yield was 772 parts, or 81% of theory. It contained 0.7% of sodium bisulfite, as determined by titration with potassium iodide. This new compound forms a stable foam in water. It melted at 203–207° C.

Analysis.—Calculated for $C_{17}H_{31}O_7N_2SNa$: nitrogen 6.5%. Found: nitrogen 6.1%.

Example 5 n-Octadecyl maleurate (600 parts) was added to a solution of 700 parts of sodium bisulfite in 4500 parts of water. The mixture was heated with stirring for 3.5 hours at 80–85° C. The product was a soapy solid which was only partly soluble in water. Most of the portion which floated on the surface was skimmed off, and the rest was separated by filtration. These two fractions were combined, washed with water, and then with ethanol, and air-dried. The yield of n-octadecyl sodium sulfo-N-carbamylsuccinamate was 461 parts, or 40% of theory. It was a white, soapy solid which melted at 74–79° C.

The original aqueous filtrate was diluted with ethanol, thereby precipitating additional product. This second crop was washed with water, and then with ethanol, and air-dried. It weighed 103 parts. Thus, the total yield of the new compound was 564 parts, or 68% of theory. This compound forms a stable emulsion of benzene with water.

Example 6

An alkyd resin dimaleurate (described above, Process C, ester #3) (705 parts) was mixed with a solution of 800 parts of sodium bisulfite in 2200 parts of water, and heated with stirring for two hours at 60–70° C. and then for 2.5 hours at 85–90° C. The viscous oil which settled to the bottom was separated, and then heated for three hours more at 85–90° C. with a stirred solution of 500 parts of fresh sodium bisulfite in 1200 parts of water. The bottom layer was again separated, shaken with water and then with alcohol, and dried at 80–90° C. at a pressure of 50–75 mm. of Hg. The sodium N-carbamylsuccinamate of the alkyd resin was a tacky oil which formed a foam with water, and stabilized a benzene-water emulsion, whereas neither the original alkyd resin nor its dimaleurate did so. The yield was 398 parts.

Example 7

A mixture of 23.2 parts of 2-nitrobutyl maleurate, 20.8 parts of sodium bisulfite and 72 parts of water was heated for 90 minutes at 80° C. The homogeneous solution was mixed at 35° C. with 290 parts of 95% ethanol, and then held at 3° C. for an hour to cause crystallization of the product. This was filtered, washed with ethanol, and dried. The white, crystalline 2-nitrobutyl sodium N-carbamylsuccinamate was obtained in 69% yield (22 parts). It has no definite melting point, but is gradually turned somewhat dark at 186–227° C., and decomposed at 233° C.

Example 8

A mixture of 30 parts of 2-nitrobutyl N-carbamylfumaramate, 40 parts of sodium bisulfite and 100 parts of water was heated at 85–90° C. for two hours, filtered hot diluted with two volumes of ethanol and cooled to 20° C. The white product was filtered, washed with ethanol and dried. The yield of 2-nitrobutyl sodium sulfo-N-carbamylsuccinamate was 35.1 parts, or 83% of theory. It darkened somewhat at 253° C., and decomposed at 266–267° C. It is isomeric rather than identical with the compound of the same name described in Example 7.

Example 9

Pentamethylene dimaleurate (34.8 parts) was added to a solution of 62 parts of sodium bisulfite in 300 parts of water. This caused the solution temperature to rise 10° C. The stirred mixture was then heated at 85–87° C. for 1.5 hours and filtered while hot. The filtrate was diluted with 480 parts of ethanol and cooled to 15° C. The white powder was filtered, washed with 50% aqueous ethanol and then with 95% ethanol, and dried. The yield of pentamethylene bis-(sodium N-carbamylsuccinamate) was 26.4 parts, or 51% of theory.

Example 10

To a solution of 484 parts of sodium bisulfite in 2200 parts of water was added 431 parts of castor oil maleurate (containing an average of two maleurate groups per castor oil molecule—see experiment 2 of Process C). The stirred mixture was heated for three hours at 88–93° C., although the reaction appeared to be complete within the first hour—as shown by changes in the appearance of the mixture. (When stirring was stopped momentarily the unreacted castor oil maleurate rose ripidly to the top of the mixture, but after the reaction had taken place the product appeared to be in the form of a stringy dispersion which separated very slowly from the hot, aqueous solution.) The mixture was allowed to separate completely at room temperature. The castor oil sodium sulfo-N-carbamylsuccinamate was then shaken twice with cold water to remove excess sodium bisulfite, and dried. It is slightly soluble in water, and stabilizes emulsions of benzene and water.

Example 11

A stirred mixture of 335 parts of a maleurate of hydrogenated castor oil (described above, Process C, ester #13), 472 parts of sodium bisulfite and 2800 parts of water was heated for 1.5 hours at 85–90° C., and was then left at room temperature for several hours. The product, which had the consistency of butter, was filtered with difficulty, and extracted with a small amount of water. After drying, the sodium sulfo-N-carbamylsuccinamate of hydrogenated castor oil was a brittle solid which melted at 80–99° C. It is slightly soluble in water, and stabilizes emulsions of benzene and water.

Example 12

A mixture of 250 parts of 2-(p-octylphenoxy)-ethyl maleurate, 73 parts of sodium metabisulfite, 375 parts of 95% ethanol and 150 parts of water was boiled under reflux for three hours. The hot, supernatant liquid was decanted from a small amount of solid sodium bisulfite and allowed to cool overnight. The white, crystalline product was filtered, washed with a little 95% ethanol, and dried. The yield of 2-(p-octylphenoxy)-ethyl sodium sulfo-N-carbamylsuccinamate was 143 parts, or 45% of theory.

*Analysis.*—Calculated for $C_{21}H_{31}O_8N_2SNa$: sulfur 6.5%. Found: sulfur 7.0%.

This product contains 0.18% free sodium bisulfite.

Example 13

A mixture of 245 parts of tridecyl maleurate, 68.4 parts of sodium metabisulfite, 240 parts of 95% ethanol and 50 parts of water was treated as shown in Example 12. The yield of the white, crystalline tridecyl sodium N-carbamylsuccinamate was 179 parts, or 56% of theory.

*Analysis.*—Calculated for $C_{18}H_{33}O_7N_2SNa$: sulfur 7.21%. Found: sulfur 7.10%, 7.18%.

Example 14

A mixture of 76.4 parts of dodecyl N-(tert-butylcarbamyl)-maleamate, 21 parts of sodium bisulfite, 160 parts of 95% ethyl alcohol and 50 parts of water was boiled under reflux for two hours, and then was cooled to room temperature. The small amount of precipitated sodium bisulfite was filtered off. The filtrate was evaporated to dryness in vacuo. The yield of n-dodecyl sodium sulfo-N-(tert-butyl-carbamyl)-succinamate, a taffy-like solid, was 95 parts. This new ester formed a stable emulsion of benzene with water, whereas the reagent maleamic ester did not.

*Analysis.*—Calculated for $C_{21}H_{39}O_7N_2SNa$: sulfur 6.58%. Found: sulfur 6.35%.

Example 15

2-(p-octylphenoxy)-ethyl sodium sulfo-N-tert-butylcarbamyl)-succinamate was made by the process of Example 14 except that 2-(p-octylphenoxy)-ethyl N-(tert-butylcarbamyl)-maleamate (89.2 parts) was used instead of the dodecyl ester reagent, and that the solvent mixture consisted of 250 parts of dioxan and 100 parts of water. After the reaction was completed, the cooled mixture separated into two phases, an aqueous phase floating on a viscous oily one. The aqueous one was discarded. The other one was shaken with water, and then evaporated to constant weight in vacuo. The residue, the said new product, was a white solid which formed a stable emulsion of water and benzene, whereas the reagent maleamic ester did not. The yield was 82 parts, or 74% of theory.

*Analysis.*—Calculated for $C_{25}H_{39}O_8N_2SNa$: sulfur 5.82%. Found: sulfur 3.4%.[1]

Other salts of sulfo-N-carbamylsuccinamic esters which can be made by my process are methyl potassium sulfo-N-carbamylsuccinamate, methyl ammonium sulfo-N-carbamylsuccinamate, methyl lithium sulfo-N-carbamylsuccinamate, methyl cesium sulfo-N-carbamylsuccinamate, methyl calcium sulfo-N-carbamylsuccinamate, methyl magnesium sulfo-N-carbamylsuccinamate, methyl strontium sulfo-N-carbamylsuccinamate, methyl sodium sulfo-N-(methyl-carbamyl)-succinamate, methyl sodium sulfo-N-(tert-butylcarbamyl)-succinamate, methyl sodium sulfo-N-phenylcarbamylsuccinamate, 2-ethylhexyl sodium sulfo-N-carbamylsuccinamate, allyl sodium sulfo-N-carbamylsuccinamate, 2-chloroethyl sodium sulfo-N-carbamylsuccinamate, 2-ethoxyethyl sodium sulfo-N-carbamylsuccinamate, cyclohexyl sodium sulfo-N-carbamylsuccinamate, and benzyl sodium sulfo-N-carbamylsuccinamate.

The new compounds of this invention are surfactants, by which it is meant that their aqueous solutions have a surface tension which is lower than that of distilled water. Thus, they are useful as detergents, emulsifiers, wetting agents, washing agents, dye assistants and/or dispersing agents.

The ability of the new compounds to lower the surface tension of water is shown by the following series of experiments, in which typical members of the new class of compounds were dissolved, in varying concentration, in distilled water. The concentration of each solution is shown, except as noted, as the molarity, i. e., the number of gram mols of solute in 1000 ml. of solution. The surface tension of each solution was measured at 26–30° C. For comparison, the surface tension of distilled water also was measured at the same temperatures. These measurements are shown in Tables I and II.

---

[1] This shows that the material is a mixture of the reagent and of the product in about equal proportions.

TABLE I

*Surface tension [a] of aqueous solutions of sodium sulfo-N-carbamylsuccinamic esters*

Molar concentrations

| Ester of Alcohol | 0.1 | 0.05 | 0.01 | 0.005 | 0.001 | 0.0005 | 0.0001 | 0.00005 | 0.00001 |
|---|---|---|---|---|---|---|---|---|---|
| Methanol | 55.3 | 59.5 | 67.1 | 67.9 | | | | | |
| Do.[b] | 58.8 | | 69.1 | | | | | | |
| n-Butanol | 48.2 | 52.9 | 60.4 | 64.9 | | | | | |
| n-Octanol | c 42.9 | c 42.8 | 48.8 | 52.5 | | | | | |
| n-Dodecanol | 31.2 | | 34.1 | 37.9 | 37.8 | 39.2 | 52.2 | 52.8 | |
| Do.[d] | 31.6 | | 34.8 | | 37.4 | 37.7 | 37.4 | 41.4 | 52.2 |
| n-Octadecanol | c 32.7 | | c 35.5 | c 35.6 | c 40.1 | 42.2 | | | |
| 2-Nitro butanol-1 | 54.6 | | 62.8 | 70.3 | | | | | |
| Do.[b] | 67.3 | | 65.1 | 70.5 | | | | | |
| 1,5-Pentanediol | 53.2 | | 64.7 | | | | | | |
| Tridecanol | c 30.3 | | 32.9 | 32.2 | 33.3 | 34.3 | 57.1 | | |
| 2-(p-octylphenoxy)-ethanol | 29.9 | 30.0 | 30.5 | 29.6 | 30.0 | 30.9 | 45.6 | 55.3 | |
| Do.[e] | 30.0 | | 33.5 | | 34.5 | | 35.5 | | f 39.0 |
| Distilled Water | 72.0–71.5 dynes/cm. at 26–30° C. | | | | | | | | |

[a] In dynes/cm. at 26–30° C.
[b] This ester was made from the corresponding trans N-carbamylamic ester. Others were made from cis esters.
[c] Esters which did not dissolve readily at room temperature were heated with water, cooled and diluted to the proper concentration. The solutions marked "c" were turbid. All others were clear.
[d] The sulfo-N-(tert-butylcarbamyl) ester shown in Example 14.
[e] The sulfo-N-(tert-butylcarbamyl) ester shown in Example 15.
[f] At 0.000001 molarity the surface tension was 42.0.

TABLE II

*Surface tension [a] of aqueous solutions of complex sodium sulfo-N-carbamylsuccinamic esters*

| Alcohol Used for Ester | Concentrations in Weight Percentage | | | | |
|---|---|---|---|---|---|
| | 5.0 | 1.0 | 0.5 | 0.1 | 0.05 |
| Castor Oil (Example 10) | 39.6 | 43.4 | 46.5 | 46.7 | 49.6 |
| Hydrogenated castor oil (Example 11) | b 38.1 | b 47.3 | b 48.7 | 56.8 | 57.0 |
| Alkyd resin (Example 6) | 48.5 | | 50.0 | 48.6 | 49.6 |

[a] In dynes/cm. at 26–30° C.
[b] Esters which did not dissolve readily at room temperature were heated with water, cooled, and diluted to the proper concentration. The solutions marked "b" were turbid. All others were clear.

Tables I and II show that sodium sulfo-N-carbamylsuccinamic esters of widely varying types of alcohols lower the surface tension of water, sometimes spectacularly even when used in very low concentration.

The new class of surfactants is valuable in stabilizing emulsions of water and benzene. Table III shows the stabilizing effect of several of the new surfactants as compared with that of two commercially available surfactants which have a somewhat similar chemical structure. In each experiment, a mixture of 1.0 g. of surfactant, 90 ml. of water and 10 ml. of benzene was shaken vigorously for three minutes, and then was allowed to stand at room temperature in a closed container until the emulsion broke.

TABLE III

*Stabilization of benzene-water emulsions by various emulsifiers*

| Surfactant | Duration of Emulsion |
|---|---|
| n-Octyl sodium sulfo-N-carbamylsuccinamate | 30 minutes. |
| n-Dodecyl sodium sulfo-N-carbamylsuccinamate | more than 4.5 days.[a] |
| n-Octadecyl sodium sulfo-N-carbamylsuccinamate | more than 60 days.[a] |
| Hydrogenated castor oil sodium sulfo-N-carbamylsuccinamate (Example 12) | more than 4.5 days.[a] |
| Alkyd resin sodium sulfo-N-carbamylsuccinamate (Example 7) | 30 minutes. |
| Aerosol LB[b] | 60 minutes. |
| Aerosol OT[c] | 4.5 days. |

[a] The emulsion showed no sign of breaking. The test was discontinued.
[b] Dibutyl sodium sulfosuccinate.
[c] Di-(2-ethylhexyl) sodium sulfosuccinate.

Table III shows that some of the new surfactants stabilize benzene-water emulsions much better than structurally similar surfactants known in the prior art.

The new class of surfactants retains excellent emulsifier and/or detergent properties in the presence of large amounts of inorganic halides such as sodium chloride, calcium chloride and magnesium chloride. In contrast, the Aerosols become ineffective under these conditions.

This difference is shown by the following two groups of experiments:

1. Two mixtures of 50 ml. of distilled water and 5 ml. of benzene were emulsified by 0.5 g. of a detergent. In one experiment the detergent was dodecyl sodium sulfo-N-carbamylsuccinamate, and in the other it was Aerosol OT. To each well-emulsified mixture there was added one g. of sodium chloride. The Aerosol-OT emulsion broke immediately and completely, whereas the emulsion made with my new emulsifier of this invention was stable for at least one hour.

2. Each of the emulsifiers (0.2 g.) shown in Table IV was dissolved in 15 ml. of hot sea water, the solutions were cooled to room temperature, then shaken with 2 ml. of benzene, and allowed to stand at room temperature. The stability of each emulsion was as shown in Table IV.

TABLE IV

*Emulsification in sea water*

| Emulsifier | Stability of Emulsion |
|---|---|
| 2-(p-Octylphenoxy)-ethyl sodium sulfo-N-carbamylsuccinamate. | Excellent.[a] |
| Aerosol OT | Poor.[b] |
| Aerosol IB | Do. |
| Aerosol BPE[c] | Do. |

[a] Over 3–4 hours.
[b] Emulsion broke almost at once.
[c] Bis-[2-(p-tert-butylphenoxy)-ethyl] sodium sulfosuccinate.

These experiments show that the new emulsifiers retain their emulsifying ability in saline solutions much better than the commercially-used sulfosuccinates.

Having thus described my invention, what I claim and desire to protect by Letters Patent is:

1. A metal salt of a sulfo-N-carbamylsuccinamic ester of a non-tertiary alcohol, in which the metal is from the group consisting of alkali metals and alkaline-earth metals, having an atomic number less than 56.

2. An alkali metal salt of a non-tertiary-alkyl ester of a sulfo-N-carbamylsuccinamic acid.

3. An alkali metal salt of the n-dodecyl ester of sulfo-N-carbamylsuccinamic acid.

4. An alkali metal salt of the n-octadecyl ester of sulfo-N-carbamylsuccinamic acid.

5. An alkali metal salt of the n-dodecyl ester of sulfo-N-(tert-butylcarbamyl)-succinamic acid.

6. An alkali metal salt of the 2-(p-octylphenoxyl)-ethyl ester of sulfo-N-carbamylsuccinamic acid.

7. An alkali metal salt of the 2-(p-octylphenoxy)-ethyl ester of sulfo-N-(tert-butylcarbamyl)-succinamic acid.

References Cited in the file of this patent

UNITED STATES PATENTS

| | | |
|---|---|---|
| 2,252,401 | Jaeger | Aug. 12, 1941 |
| 2,265,944 | Langhorst et al. | Dec. 9, 1941 |
| 2,652,348 | Carnes et al. | Sept. 15, 1953 |